United States Patent
Lamison-White

(10) Patent No.: US 10,558,954 B1
(45) Date of Patent: Feb. 11, 2020

(54) SYSTEM FOR MAINTAINING ACCOUNT VALUATION OF DIGITAL CURRENCY ACCOUNTS

(71) Applicant: Eric Lamison-White, San Francisco, CA (US)

(72) Inventor: Eric Lamison-White, San Francisco, CA (US)

( * ) Notice: Subject to any disclaimer, the term of this patent is extended or adjusted under 35 U.S.C. 154(b) by 0 days.

(21) Appl. No.: 16/176,772

(22) Filed: Oct. 31, 2018

Related U.S. Application Data

(63) Continuation of application No. 14/331,413, filed on Jul. 15, 2014, now Pat. No. 10,121,126.

(51) Int. Cl.
| | |
|---|---|
| *G06Q 20/06* | (2012.01) |
| *G06Q 40/00* | (2012.01) |
| *G06Q 20/40* | (2012.01) |
| *G06Q 20/38* | (2012.01) |

(52) U.S. Cl.
CPC ......... *G06Q 20/06* (2013.01); *G06Q 20/0655* (2013.01); *G06Q 20/381* (2013.01); *G06Q 20/405* (2013.01); *G06Q 40/00* (2013.01)

(58) Field of Classification Search
CPC ..................................... G06Q 40/00
See application file for complete search history.

(56) References Cited

U.S. PATENT DOCUMENTS

| | | | |
|---|---|---|---|
| 8,224,730 B2 | 7/2012 | Hadi et al. | |
| 8,554,662 B2 | 10/2013 | Al-Saadi | |
| 9,672,499 B2* | 6/2017 | Yang | G06Q 20/3678 |
| 9,679,276 B1* | 6/2017 | Cuende | G06Q 20/065 |
| 9,703,986 B1* | 7/2017 | Ashley | G06F 21/6263 |
| 9,704,143 B2* | 7/2017 | Walker | G06Q 20/06 |
| 9,779,557 B2* | 10/2017 | Hauser | G07C 5/008 |
| 9,794,074 B2* | 10/2017 | Toll | G06F 21/602 |
| 2012/0239543 A1 | 9/2012 | Ryan | |
| 2012/0278200 A1* | 11/2012 | van Coppenolle | G06Q 30/02 705/26.35 |
| 2013/0238478 A1 | 9/2013 | Bruno | |
| 2013/0311348 A1* | 11/2013 | Samid | G06Q 40/00 705/37 |
| 2014/0222563 A1* | 8/2014 | Ramachandran | G06Q 40/04 705/14.53 |

(Continued)

FOREIGN PATENT DOCUMENTS

| | | |
|---|---|---|
| WO | WO2009131751 | 10/2009 |
| WO | WO2012172117 | 12/2012 |
| WO | WO2013012467 | 1/2013 |

OTHER PUBLICATIONS

M. Shoaib, Official Digital Currency, Eighth International Conference on Digital Information Management (ICDIM 2013) (pp. 346-352) (Year: 2013).*

Primary Examiner — Chikaodinaka Ojiaku
(74) Attorney, Agent, or Firm — Goldstein Law Offices, P.C.

(57) ABSTRACT

A digital currency account stabilization system for maintaining valuation of a digital currency account balance against a reference currency. The digital currency account balance is maintained in a currency account and has an initial value. Hedging positions are opened to maintain the valuation of the currency account at the initial value. When the valuation of the digital currency fluctuates, digital currency is added or deducted from the currency account to maintain the initial value.

8 Claims, 3 Drawing Sheets

(56) References Cited

U.S. PATENT DOCUMENTS

| | | | | |
|---|---|---|---|---|
| 2015/0046337 A1* | 2/2015 | Hu | G06Q 20/0658 | 705/65 |
| 2015/0100475 A1* | 4/2015 | Cummings | G06Q 20/108 | 705/38 |
| 2015/0120567 A1* | 4/2015 | Van Rooyen | G06Q 20/3829 | 705/59 |
| 2015/0170112 A1* | 6/2015 | DeCastro | G06Q 20/381 | 705/39 |
| 2015/0205929 A1* | 7/2015 | Brama | G06F 19/3418 | 705/3 |
| 2015/0220928 A1* | 8/2015 | Allen | G06Q 20/0655 | 705/67 |
| 2015/0227890 A1* | 8/2015 | Bednarek | G06Q 10/08355 | 705/26.81 |
| 2015/0228004 A1* | 8/2015 | Bednarek | G06Q 30/0633 | 705/26.8 |
| 2015/0245084 A1* | 8/2015 | Downing | G06F 16/2465 | 725/12 |
| 2015/0287026 A1* | 10/2015 | Yang | G06Q 20/3678 | 705/69 |
| 2015/0294308 A1* | 10/2015 | Pauker | G06Q 20/3827 | 705/67 |
| 2015/0310424 A1* | 10/2015 | Myers | G06Q 20/3678 | 705/69 |
| 2015/0310476 A1* | 10/2015 | Gadwa | G06Q 30/0226 | 705/14.27 |
| 2015/0324764 A1* | 11/2015 | Van Rooyen | G06Q 20/3276 | 705/69 |
| 2015/0324789 A1* | 11/2015 | Dvorak | G06Q 20/3823 | 705/67 |
| 2015/0332395 A1* | 11/2015 | Walker | G06Q 20/06 | 705/69 |
| 2015/0356524 A1* | 12/2015 | Pennanen | G06Q 20/065 | 705/71 |
| 2015/0356555 A1* | 12/2015 | Pennanen | G06Q 20/06 | 705/71 |
| 2015/0371224 A1* | 12/2015 | Lingappa | G06Q 20/3829 | 705/71 |
| 2015/0379510 A1* | 12/2015 | Smith | G06Q 20/3829 | 705/71 |
| 2017/0005804 A1 | 1/2017 | Zinder | | |

* cited by examiner

SYSTEM FOR MAINTAINING ACCOUNT VALUATION OF DIGITAL CURRENCY ACCOUNTS

CROSS-REFERENCE TO RELATED APPLICATIONS

This application is a continuation of non-provisional patent application Ser. No. 14/331,413 filed in the United States Patent office on Jul. 15, 2014, claims priority therefrom, and is expressly incorporated herein by reference in its entirety.

TECHNICAL FIELD

The present disclosure relates generally to digital currency management systems. More particularly, the present disclosure relates to a system that provides valuation stability to a holder of digital currency—transparent to the user—while allowing transactional use of the currency by the user.

BACKGROUND

Currencies have existed for thousands of years. As a means of simplifying trade, moving beyond subsistence, and allowing banking systems to be created, governments create currency as the official currency for use within their country. In many cases, it is necessary for the currency to be used beyond the borders of its home country. In particular, international trade between entities in different countries often takes place using the currency of one of the countries, in accordance with the known valuation of that currency respect to the currency of the other country.

Perhaps out of a desire to avoid control of monetary transactions by individual governments in an increasingly international environment, and perhaps out of a desire to meet the sophistication of modern transactions with an equally sophisticated monetary instrument, so called "digital currencies" have arisen. While there is some debate regarding terminology among the media and banking officials, digital currency is a digital form of virtual currency. A further example of a digital currency is a cryptocurrency, which uses cryptographic principles for authenticating transactions.

Bitcoin was the first cryptocurrency created in 2009. Bitcoin was created in the context of a distributed, decentralized system. Its monetary unit—also called "Bitcoin"—exists only by virtue of a ledger maintained by numerous entities on a worldwide computer network, known as a block chain transaction ledger. All transactions involving Bitcoin are accounted for on the block chain. Access to one's Bitcoin is provided by possession of two keys: a public key, which is tantamount to an account number, and a private key. Software is often used to facilitate transactions by keeping these keys conveniently available for the Bitcoin user (such as on their personal computer, smartphone or the like) in what is sometimes called a "wallet". Since Bitcoin was introduced, many other digital currencies have been created with varying success.

The value of any currency is often measured against other currencies. That is, the value of a currency is commonly defined by its ability to buy another currency. Values of currencies fluctuate due to a variety of factors. Because of its newness and since trust, usage, and acceptance of digital currency is constantly evolving, its value can fluctuate wildly.

Currency value fluctuation can be both desirable and undesirable. Clearly, some people value stability, as they want to know that they can rely on its buying power for purchasing goods and services. Just as investors often do by trading traditional currencies on money markets, profit can be made by shrewd investors when the value of digital currencies fluctuate. Accordingly, some investors may buy digital currencies on speculation, hoping the gain through large increases in value. Other investors position themselves to profit when the relative value of the digital currency decreases.

Clearly, however, the growth and success of a currency depends more upon its acceptance by consumers than by investors. Volatility is a significant barrier for consumer adoption of digital currencies. Reduction of the risk to consumers due to volatility, is therefore critical to the success of digital currencies.

Also, with the decentralization of many financial markets, the possibility is arising for a currency system that seeks to provide the stability desired by consumers, and serves the investment potential desired by others.

Various systems have been devised that facilitate transactions of digital currency, or for optimizing trades on futures markets. While these units may be suitable for the particular purpose employed, or for general use, they would not be as suitable for the purposes of the present invention as disclosed hereafter.

BRIEF SUMMARY

It is an aspect of an example embodiment of the present disclosure to provide a system for maintaining digital currency, where the value of a digital currency account is maintained despite market fluctuations in the value of a digital currency.

It is another aspect of an example embodiment of the present disclosure to provide a system that allows an entity to take the role of stabilizing entity for the digital currency account and thereby receive gains and assume losses in valuation from that digital currency account.

It is yet another aspect of an example embodiment of the present disclosure to provide a system that allows the currency account being stabilized to also be used for transactions. Accordingly, transactions on the digital currency account are communicated to the stabilizing entity so that hedging positions can be purchase or closed out in accordance with the change in account balance.

The disclosure describes a digital currency account stabilization system for maintaining valuation of a digital currency account balance against a reference currency. The digital currency account balance is maintained in a currency account and has an initial value. Hedging positions are opened to maintain the valuation of the currency account at the initial value. When the valuation of the digital currency fluctuates, digital currency is added or deducted from the currency account to maintain the initial value.

To the accomplishment of the above, this disclosure may be embodied in the form illustrated in the accompanying drawings. Attention is called to the fact, however, that the drawings are illustrative only. Variations are contemplated as being part of the disclosure.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 1:
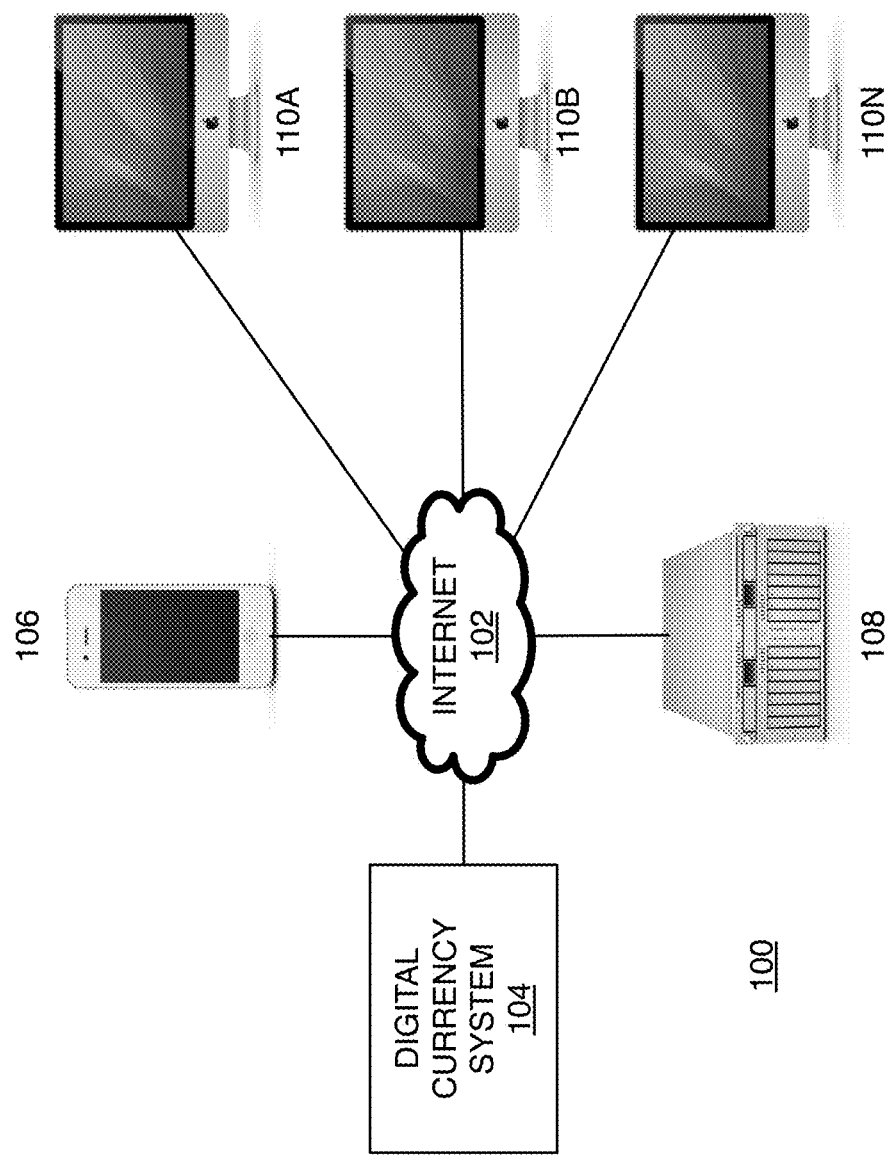
FIG. 1 is a block diagram, illustrating functional interconnection of various components according to an example embodiment of the present disclosure.

FIG. 1 illustrates a computer network 100, which may be used in accordance with the principles illustrated in the present disclosure. In particular, the network 100 employs the Internet 102 for interconnecting various components including a first user 110A, a second user 110B, and an nth user 110N. In addition, a digital currency system 104 is accessible by the users 110A, 110B, 110N through the Internet 102. The digital currency system 104 may be a single entity, or it may be numerous entities that create the digital currency system 104 through a distributed, decentralized arrangement. For example, digital currency may be used to monetary complete transactions using a smartphone 106 linked to a payment server 108, may be transferred to other users 110N, and may be maintained in cryptographic form indefinitely.

The digital currency system 104 includes a means for maintaining digital currency accounts, which may be called an "address", and herein are simply referred to as "currency accounts". The account includes a first account, owned by the first user 110A. Each account has an account balance, measured in digital currency and thus is a digital currency balance. Each currency account also may have identifying and security data, employed to ensure that attempted transactions involving the currency account are indeed authorized by the account owner.

The digital currency system has a digital currency unit, which is the monetary instrument maintained by the system. The digital currency unit has a value or valuation, which is determined in relation to a reference currency. For example, the reference currency may be U.S. dollars. Then, at a given time, one digital currency unit might have a value of, for example, 400 U.S. dollars ($400.00).

In accordance with the principles of the present disclosure, the system may be configured to stabilize the value of the digital currency in one or more of the user accounts, such that the digital currency balance is changed by another entity to maintain the value with respect to the reference currency.

For example, the second user 110B may possess a stabilizing account. The stabilizing account may transfer digital currency into or out of one or more currency accounts under certain conditions. The stabilizing account monitors the digital currency balance in associated currency accounts and the value of that balance according to the reference currency. Further in accordance with the principles of the present disclosure, the stabilizing account may transfer digital currency into the currency account to compensate for a loss in value of that currency account, and may transfer digital currency out of the currency account equivalent to a gain in value in that currency account.

What follows is a non limiting example of valuation and stabilization following principles of the present disclosure to maintain valuation of the currency account: Suppose the account balance is initially four units of digital currency, with each unit valued at $10.00, for a total of $40.00. If the value of the digital currency drops to $5.00 per unit, four more units of digital currency will be added to bring the account balance to eight units for a total valuation of the digital currency in the currency account of $40.00. On the other hand, if the value of the digital currency increases to $20.00 per unit, two units of digital currency will be deducted to bring the account balance to two units for a total value of still $40.00.

Figure 2:
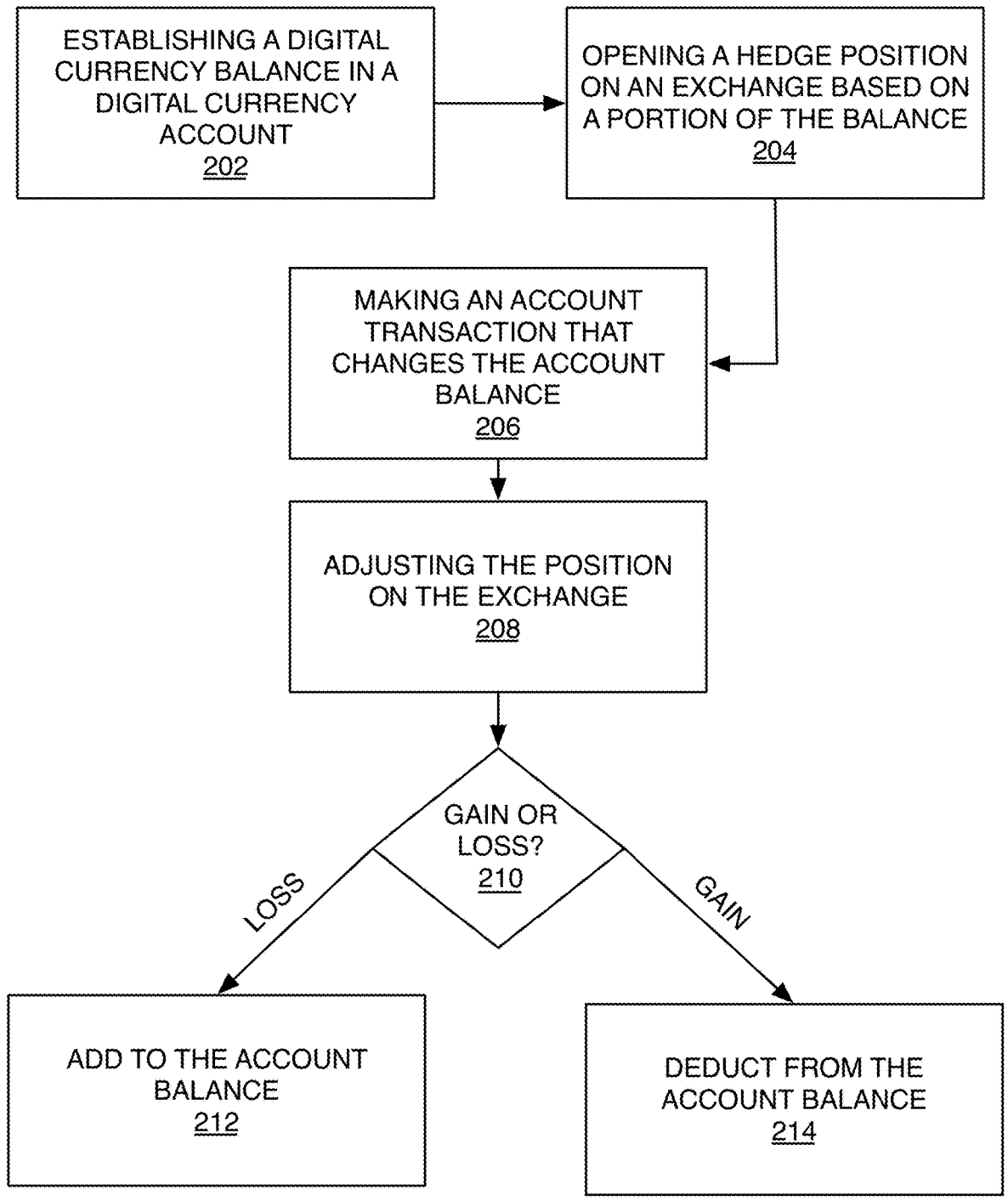
FIG. 2 is a flow diagram, illustrating steps followed in an example embodiment of the present disclosure employing an exchange.

Referring now to FIG. 2, an example is provided that illustrates the simultaneous use and stabilization of digital currency in a currency account 200. For simplification in the example illustrated, the role of the stabilizing account is taken generally by an exchange upon which hedge positions can be purchased and sold. Note that this role can be assumed by one or more entities, centralized or decentralized, public or private.

In particular, initially a digital currency balance is established in a digital currency account 202, perhaps at the point in which the account is initially funded. Then a hedge position is opened on an exchange based on a portion of the balance 204. Note that hedge position can be made to protect/stabilize the entire balance, a portion of the balance, and such can be allocated among more than one entity. The account balance may be used as collateral to allow the hedge position to be opened on an electronic exchange. The general principles of hedging, or delta hedging themselves are well known to financial professionals and thus are beyond the scope of this discussion.

At some point during maintenance of the currency account, its owner may make a transaction that changes the account balance 206 to a new account balance. Such transactions may include, but are not limited to, adding additional digital currency, transferring digital currency to another account, purchasing goods or services, purchasing another currency, etc.

In response to the change in account balance, the hedging position on the exchange is adjusted 208. In particular, if the balance is increased, additional units of a hedging instrument may be purchased. If the account balance is decreased, an appropriate portion of the hedging positions may be closed out.

As previously discussed, the digital currency will likely fluctuate in value with regard to the reference currency. Accordingly, the system may determine whether a gain or loss 210 has occurred with regard to the value in the currency account. If a loss has occurred, digital currency may be added to the account balance 212. If a gain has occurred, a deduction may be made from the account balance 214. Note that as described herein, the term "exchange" may be interpreted very loosely. As financial instruments are being traded in an increasingly decentralized and more peer-to-peer manner, the notion of what constitutes an exchange may deconstruct to be more akin to a different type of account holder or user on the system. In particular, with the use of digital currencies and as financial markets become increasingly decentralized, it is possible to make transactions and move funds between accounts nearly instantly. In addition, where securities transactions required a settlement period of days, transactions can now be settled and finalized between bank accounts and trading accounts in minutes or less. In addition, this monitoring and account adjustment can occur at such frequency and at such small increments of value change that to the user, the account always seems to maintain its value.

Figure 3:
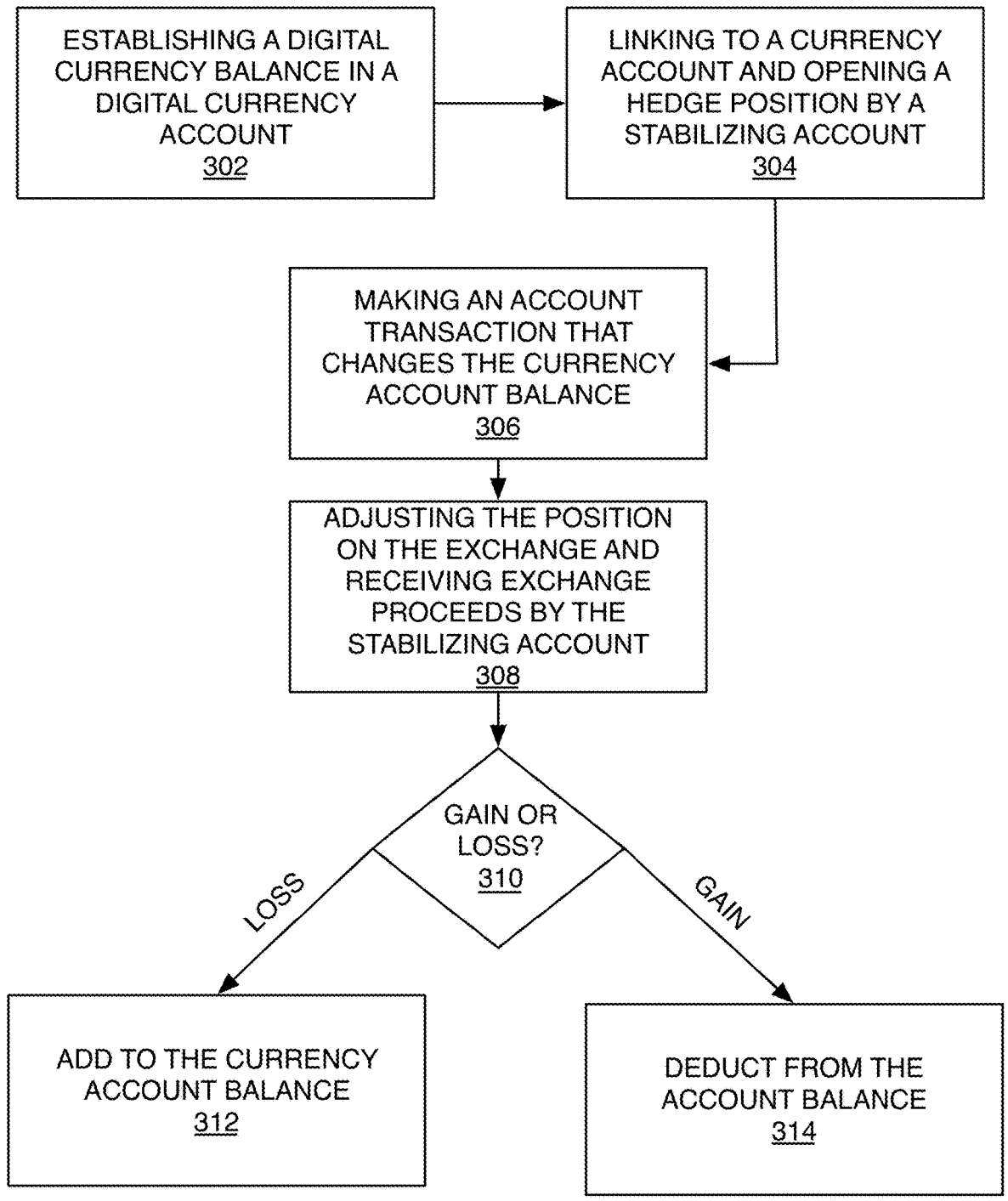
FIG. 3 is a flow diagram, illustrating steps followed in another example embodiment of the present disclosure, employing a stabilizing account.

Accordingly, FIG. 3 illustrates a further example of interplay between the stabilizing account and the currency account for the sake of allow simultaneous use by the currency account and stabilization thereof. In particular, an event occurs, such as initial funding, which results in the establishment of a currency balance of digital currency in a digital currency account 302, in which the digital currency has an initial value (with respect to the reference currency).

Next, the currency account is linked to one or more stabilizing accounts, which establish a hedging position in accordance with the currency balance in the currency account 304. Note that similarly, a stabilizing account can be linked to one or more currency accounts. Also note that the extent to which the stabilizing account actually opens the position on an exchange, or underwrites or shares the risk of digital currency volatility with other stabilizing accounts/entities, can be the subject of innumerable possibilities. Also the extent and type of hedging position or futures contract opened in accordance with the account balance is one that would predictably be sufficient to maintain that account balance in the face of reasonable volatility.

Next, during the customary usage of the digital currency account, a transaction is made that changes the balance of digital currency in said currency account 306. This change is communicated to the associated stabilizing account (or accounts) and adjustment is made to its hedging position 308. In addition, proceeds are received from the exchange by the stabilizing account from closed or partially closed positions, from maturing futures contracts, forward contracts, options, swaps, or other assets and derivatives that create the hedging position. Any required deficits owed to the exchange is also paid by the stabilizing account.

The stabilizing account continues to monitor the currency account as well as the value of the digital currency contained therein and determines whether there is a gain or loss 310 from the initial value. When there is a loss in value of the digital currency, the stabilizing account adds to the currency account balance 312 to compensate for the loss in value. When there is a gain in the value of the digital currency, the stabilizing account deducts from the currency account to restore the currency account to its initial value 314. Note that in the example provided in FIG. 3, the use of exchanges, hedging positions, and the like are all outside the view of the user that owns the currency account. The stabilizing account does all the work necessary to cover/hedge the risk of volatility, and simply adds and deducts from the currency account. To the user that owns the currency account, the digital currency they own maintains a consistent value with respect to the reference currency.

In conclusion, herein is presented a system for maintaining stable valuation within a digital currency account. The invention is illustrated by example in the drawing figures, and throughout the written description. It should be understood that numerous variations are possible, while adhering to the inventive concept. Such variations are contemplated as being a part of the present disclosure.

What is claimed is:

1. A method of maintaining stable valuation of digital currency and facilitating transactional use thereof, comprising the steps of:
   providing a digital currency system having a plurality of decentralized computing devices operably which are connected via a network and are adapted to maintain a block chain transaction ledger, the digital currency system further having a plurality of digital currency units implemented using the block chain ledger;
   creating a digital currency account for an owner, establishing a digital currency account balance for said digital currency account having at least one of the digital currency units;
   determining an initial value of the digital currency account balance with respect to a reference currency;
   linking the digital currency account to a stabilizing account, and establishing a hedging position based on a portion of the digital account currency balance;
   initiating an account transaction by the owner and changing the digital account currency balance;
   adjusting the hedging position by the stabilizing account in response to the change in the digital account currency balance; and
   monitoring the value of the digital currency within the digital currency account with respect to the reference currency by the stabilizing account, adding digital currency to the digital currency account balance to compensate for a reduction in value with respect to the reference currency, and deducting digital currency from the digital currency account balance to compensate for an increase in value with respect to the reference currency.

2. The method as described in claim 1, wherein:
the step of adjusting the hedging position further comprises the steps of purchasing additional units of a hedging instrument in response to an increase in the digital account currency balance and closing a portion of the hedging position in response to a decrease in the digital account currency balance.

3. The method as described in claim 2, wherein:
the step of initiating an account transaction by the owner further comprises the steps of transmitting the account transaction to the digital currency system, and recording the account transaction to the block chain transaction ledger by the decentralized computing devices.

4. The method as described in claim 3, wherein:
the step of adjusting the hedging position further comprises the steps of communicating the change in the digital currency account balance to an exchange, and receiving proceeds to the stabilizing account resulting from the closed portion of the hedging position.

5. The method as described in claim 4, wherein:
the step of monitoring the value of the digital currency within the digital currency account balance further comprises the steps of adding or deducting digital currency to or from the digital currency account balance by transferring digital currency between the stabilizing account and the digital current account.

6. The method as described in claim 5, wherein:
the step of linking the digital currency account to a stabilizing account, further comprises establishing a hedging position by the stabilizing account based on a portion of the digital account currency balance.

7. The method as described in claim 6, wherein:
the step of monitoring the value of the digital currency within the digital currency account with respect to the reference currency by the stabilizing account further comprises the step of adding or deducting digital currency to or from the digital currency account balance by transferring digital currency between the stabilizing account and the digital current account to maintain consistency between the value of the digital currency account balance and the initial value.

8. The method as described in claim 7, wherein:
the step of adjusting the hedging position further comprises one of: opening, closing, and partially closing by the stabilizing account at least one item selected from the group consisting of future contracts, forward contracts, swaps, and derivatives.

\* \* \* \* \*